United States Patent [19]

Weinblatt et al.

[11] Patent Number: 5,748,889
[45] Date of Patent: May 5, 1998

[54] MONITORING IDENTITY OF COMPUTER USERS ACCESSING DATA BASES, AND STORING INFORMATION ABOUT THE USERS AND THE ACCESSED DATA BASE

[75] Inventors: Lee S. Weinblatt, 797 Winthrop Rd., Teaneck, N.J. 07666; Thomas Langer, Teaneck, N.J.

[73] Assignee: Lee S. Weinblatt, Teaneck, N.J.

[21] Appl. No.: 730,120

[22] Filed: Nov. 5, 1996

Related U.S. Application Data

[63] Continuation of Ser. No. 503,814, Jul. 18, 1995, abandoned.
[51] Int. Cl.$^6$ .............. G06F 13/00; G11B 23/28; H04L 9/00; H04K 1/00
[52] U.S. Cl. .............. 395/187.01; 395/188.01; 380/3; 380/4; 380/23; 380/25
[58] Field of Search .............. 395/186, 187.01, 395/188.01; 380/3, 4, 9, 21, 23, 25, 42, 44

[56] References Cited

U.S. PATENT DOCUMENTS

| | | |
|---|---|---|
| 4,659,314 | 4/1987 | Weinblatt . |
| 4,718,106 | 1/1988 | Weinblatt . |
| 4,827,508 | 5/1989 | Shear .............. 380/4 |
| 4,837,568 | 6/1989 | Snaper .............. 340/825.54 |
| 4,930,011 | 5/1990 | Kiewit . |
| 4,977,594 | 12/1990 | Shear .............. 380/4 |
| 5,050,213 | 9/1991 | Shear .............. 380/25 |
| 5,247,575 | 9/1993 | Sprague et al. .............. 380/9 |
| 5,410,598 | 4/1995 | Shear .............. 380/4 |
| 5,418,713 | 5/1995 | Allen .............. 364/403 |

OTHER PUBLICATIONS

"Touch Connections", Dallas Semiconductor, Spec. Slts. 10–13. Touch Access System, Wiegand Emulating Touch Reader, 1994.

*50 Ways to Touch Memory*; Third Edition, Dallas Semi Conductor; pp. 4–7, 42–47, and 64, 1994.

Spender, J.C., Identifying Computer Users w/Authentication Devices(Tokens); Computer & Security 6, pp. 385–395, 1987.

"Modern Technology Tools for User Authentication", Random Bite & Bytes pp. 183–184, 1990.

*Primary Examiner*—Robert W. Beausoliel, Jr.
*Assistant Examiner*—Norman M. Wright
*Attorney, Agent, or Firm*—Frishauf, Holtz, Goodman, Langer & Chick, P.C.

[57] ABSTRACT

A monitoring technique for identifying users who access a particular data base. A unique code is precoded in each of the data bases being monitored. When access to a data base is designated by the user, the precoded portion therein is read to retrieve the code. If the retrieved code matches any of the codes stored in memory for data bases which are being monitored, the existence of a match actuates a trigger signal source which is part of a stationary unit. The source emits a trigger signal from the stationary unit which is received by a portable unit, such as a watch, worn by the user. The watch responds to the received trigger signal by emitting an ID signal unique to its associated user. That ID signal is detected and stored by the stationary unit.

9 Claims, 2 Drawing Sheets

MONITORING IDENTITY OF COMPUTER USERS ACCESSING DATA BASES, AND STORING INFORMATION ABOUT THE USERS AND THE ACCESSED DATA BASE

This application is a Continuation of application Ser. No. 08/503,814, filed Jul. 18, 1995, now abandoned.

BACKGROUND OF THE INVENTION

The present invention is directed to a technique for monitoring the identity of computer users and, in particular, for determining which person is accessing a particular data base with the computer.

One of the fast growing areas for the use of computers involves the vast amount of information of different types which is available, and how to make it more readily accessible to the public. This is being done in many ways. For example, information that has previously been provided in the form of hard copy, such as telephone books, store catalogs, technical information, legal information, newspapers and magazines, educational information, etc. are being stored on compact disks with a high capacity for storing information, now commonly known as CD ROM. A lower capacity storage medium, but highly popular, are the magnetic disks, or diskettes, usable in the disk drives of computers, either in 5¼ inch or 3½ inch formats. Various on-line services are also accessible in real time over telephone lines by a computer that is equipped with a modem. Examples of these are CompuServ, Prodigy and America On Line. Moreover, the worldwide exchange and distribution of information will become increasingly facilitated by the growing use of the Internet worldwide web.

All of the above-described information sources, namely CD-ROM, diskettes and on-line services, and many others like them, will be referred to hereinbelow for the sake of convenience by the term "sources", and the accessed information thereon by the term "data bases". As is readily apparent, such data bases can be provided for many purposes. One particular purpose has to do with the general field of advertising in the sense that the information in the data base is designed to ultimately sell a product to the computer user who has accessed such a data base. Thus, a source such as a CD-ROM can provide a store catalog as one advertising data base, or newspaper classified ads as another such data base.

For such advertising-related data bases, and some others as well, it is very useful for the advertiser and/or the information provider e.g., manufacturers and distributors of ROM's, access providers on Internet nodes, etc., to collect information about the people who have accessed a particular data base. Thus, to use the example of a store catalog mentioned above, that catalog can be available by CD ROM or on the Internet. The advertiser would find it useful to know how many people access the computerized data base, as well as their individual characteristics so that, for example, the advertisements might be tailored to that type of individual in terms of education, interests, geographical location, annual income, family size, type of dwelling, etc. Also, the provider of the data base, such as an access provider on Internet, might be charging the advertiser a certain fee, and such fee could be based on the number of people that access the data base during a given period of time.

One way the frequency of access on the Internet is determined at present is by simply counting the number of "hits" on a particular "page". However, it is well known that some computers are set to automatically access a data base at a particular time each day regardless of whether the computer is manned. Thus, the monitoring system would count a "hit" even though no person is actually there to collect the information. Conversely, page access is counted as one "hit" assuming that only one person is benefitting from the information whereas, in fact, a "hit" on one page could be viewed by many people simultaneously or in sequence. Consequently, there is a necessity now, which will only grow and become more critical in the future, to be able to not only tabulate the number of people who have gained access to a particular data base but, in addition, to have some information about the characteristics of such particular individuals which could be put to good use.

SUMMARY OF THE INVENTION

One object of the present invention is to more accurately monitor the number of individuals who gain access to a computerized data base.

Another object of the present invention is to obtain information specific to the identity of persons who have gained access to a particular computerized data base.

A further object of the present invention is to readily retrofit a computer so that it can provide such monitoring functions.

Yet another object of the present invention is to provide an apparatus to perform such monitoring functions which does not inconvenience the computer users.

Still another object of the present invention is to monitor the identity of the computer user and the specific information on the accessed data base which was of interest to such user.

These and other such objects are attained by one aspect of the present invention which is directed to apparatus for monitoring access by computer users to data bases available on information sources. The apparatus includes a stationary monitoring portion and a plurality of portable transmitter devices. The stationary monitoring portion includes a signal detector, a comparator, a trigger signal source, an ID signal processing circuit, and a memory. The comparator determines whether a match exists between a signal detected by the signal detector and codes stored in a memory related to an information source accessible by a computer and/or a data base accessible by a computer. The trigger signal source is coupled to the comparator for emitting a trigger signal when the comparator finds a match to trigger the portable transmitter device to emit an ID signal. The ID signal processing circuit is responsive to the emitted ID signal to compare the emitted ID signal with stored ID codes and, if a match with a particular ID code is found, to output the particular ID code. The memory is coupled to the output of the ID signal processing circuit to store the particular ID code. Each of the portable transmitter devices comprises means responsive to the trigger signal to emit an ID code stored therein.

Another aspect of the present invention is directed to apparatus for monitoring access by computer users to a data base having a code applied thereto. It includes a detector for detecting the code when the data base is accessed and producing an output signal in response thereto. A trigger signal source emits a trigger signal responsive to the detector output. A portable device worn by computer users is responsive to the trigger signal within a predetermined distance from the trigger signal source to emit an ID code signal unique to the computer user wearing it. A comparator compares the ID code signal from the portable device with stored ID codes and, if a match is found, actuates a memory to store a matched ID code and the data base code.

Yet another aspect of the present invention is directed to a method for monitoring access by computer users to data bases available on information sources with apparatus including a stationary monitoring portion and a plurality of portable transmitter devices. A signal is detected, and a determination made whether a match exists between the detected signal and codes stored in a memory related to an information source accessible by a computer and/or a data base accessible by a computer. A trigger signal is emitted when the determining step finds a match, and this is followed by triggering the portable transmitter device in response to the trigger signal to emit an ID signal. Then, responsive to the emitted ID signal, the emitted ID signal is compared with stored ID codes and, if a match with a particular ID code is found, the particular ID code is outputted and stored.

Still another aspect of the present invention is directed to a method for monitoring access by computer users to a data base having a code applied thereto. The code is detected when the data base is accessed and an output signal is produced in response thereto. A trigger signal is emitted responsive to the output signal. A portable device is provided that is worn by computer users and which is responsive to the trigger signal within a predetermined distance from a source of the trigger signal to emit an ID code signal unique to the computer user wearing it. This is followed by comparing the ID code signal from the portable device with stored ID codes and, if a match is found, actuating the storing of a matched ID code and the data base code.

DETAILED DESCRIPTION OF THE INVENTION

In order to conduct the monitoring contemplated by the present invention, a group of people will be selected to be participants. The particular people will be selected in accordance with the aims of the monitoring operations in terms of geographical location, group size, age, income, etc. These personal characteristics will be stored electronically, and each individual will be assigned an identification (ID) code. That code will be inputted into a wearable item, as discussed below, so that it can be on that individual's person. Further in accordance with the present invention, information providers will apply a code to their product. The nature and purpose of that code are discussed below.

Figure 1:
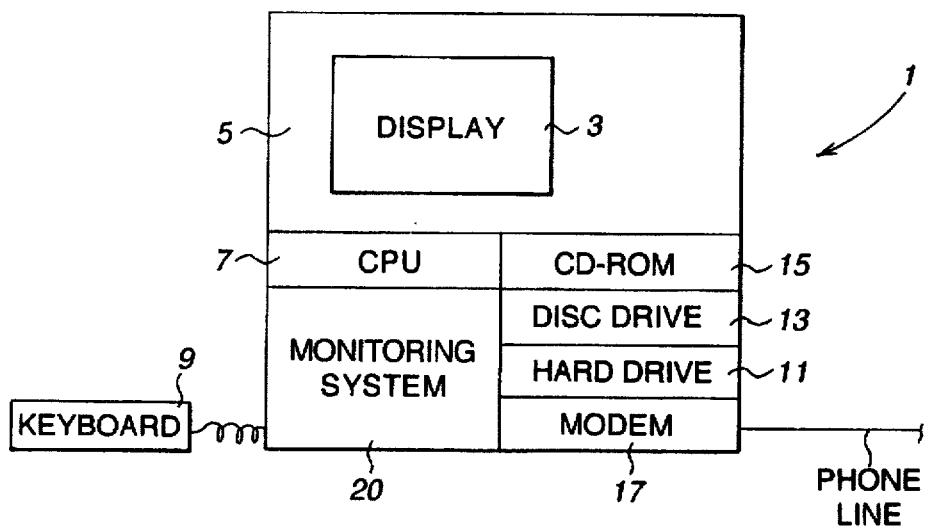
FIG. 1 is a schematic representation of a conventional personal computer which has been modified in accordance with the present invention.

FIG. 1 depicts a combination of components which together have become commonly known as a "personal computer", or "PC". The PC 1 includes a display 3 secured in a suitable casing or cabinet 5. A central processing unit (CPU) includes most of the control, memory and processing circuitry for running the PC. A keyboard 9 is provided for interfacing with the user. A variety of permanent memory devices is provided in the form of a hard drive 11, disk drive (also known as "floppy" drive) 13, and a CD ROM drive 15. Drives 11 and 13 are accessible by CPU 7 for storing and retrieving information. CD ROM 15 under current technology is provided only for retrieval and not storage of information by PC 1. Modem 17 is included for the purpose of connecting PC 1 to remote computer locations by telephone lines. On-line services 14 (see FIG. 2) are accessible in this way. Of course, a full PC system in use would include a variety of other components as well, most prominent of which is a printer, but which are not shown nor discussed herein for the purpose of brevity.

Figure 2:
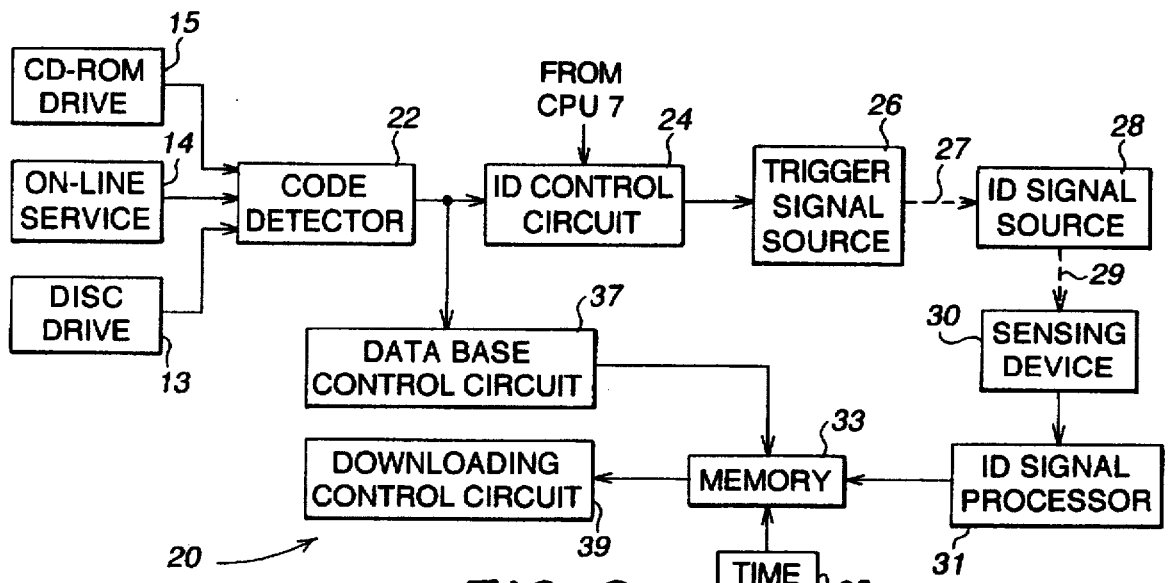
FIG. 2 is a schematic circuit diagram of a stationary monitoring system of the present invention.

In accordance with the present invention, the conventional PC 1 is augmented with a monitoring system 20. Monitoring system 20 is comprised of electronic circuitry which is contained in its own housing and includes wires and interfaces for coupling its circuitry to circuits of interest in PC 1. Details of how this is done will be readily apparent to anyone with ordinary skill in the art based on the explanations provided hereinbelow. Details of monitoring system 20 are shown in FIG. 2.

It is well known that computers typically carry out myriad operations having to do with activities that are not of interest to the particular entity, such as advertisers, that wish to monitor the computer users. Thus, while the computer user is doing wordprocessing or databasing or arithmetic operations, for example, monitoring system 20 will remain largely dormant. However, when the user accesses a data base of interest, monitoring system 20 will be placed fully in operation.

More particularly, one way of activating monitoring system 20 during the computer operations of interest to the advertiser is to have the information provider add a code signal to those data bases of interest to the advertiser. Thus, using the above-provided example of a store catalog, it would be precoded with a unique code that, for example, identifies that particular store catalog. The code could also contain information on whether the product code is on a CD ROM or on an Internet source. No specifics on this code are available because that would have to most likely be developed as an industry standard, much the way bar codes were.

Monitoring system 20 is provided with a code detector 22 into which a number of codes have been prestored. Code detector 22 monitors all the data accessing and retrieval operations performed by CPU 7. This could mean that after a source is accessed, code detector 22 is ready to receive and process signals received from the accessed source. If PC 1 is to be used for monitoring only CD-ROM 15, then a code assigned thereto would be stored in code detector 22 and only it would activate the below-described monitoring operation. Likewise, possibly only certain data bases on CD-ROM 15 are to be monitored. Thus, the codes associated with such data bases are stored in code detector 22.

When, after such access is established, code detector 22 determines that it has received one of the codes stored therein, it sends an output signal to ID control circuit 24. Circuit 24 performs one or more-of the following functions. Firstly, it produces a control signal to actuate trigger signal source 26. As its name implies, source 26 is designed to generate a trigger signal the nature of which is discussed in more detail below. However, its purpose is to trigger, or initiate the transmission, of a return signal from ID signal source 28, also explained in more detail below.

Returning to circuit 24, after it sends an initial control signal, it sends a sequence of control signals to source 26 at predetermined intervals. Thus, code detector 22 can operate to receive the code stored on, for example, CD ROM 15, but that code is received and processed by code detector 22 only once. However, as long as that same source and/or data base is being accessed, circuit 24 will continue to have trigger signals emitted by trigger signal source 26 at periodic intervals in order to check on whether the same user is still in the vicinity and, if not, whether no user is now at the computer or, perhaps whether a new user is now in the picture. ID control circuit 24 receives an input from CPU 7 which indicates whether CD ROM drive 15 is still being accessed and/or whether the same data base is still being consulted. If not, then circuit 24 stops its generation of control signals and waits for another output signal from code detector 22.

Source 26 can be of any type, such as acoustic, infrared, radio frequency, etc. which is capable of emitting a signal. However, source 26 must have the following characteristics. Firstly, the emitted signal must have a maximum effective range of 3 feet because, otherwise, it might trigger a response from other persons in the vicinity, participants in this monitoring operation (e.g. several family members), but who are not using PC 1. Secondly, source 26 must be a type of device that can readily be installed to retrofit PC 1 in the field. Thus, the source could be applied, for example, to a corner of keyboard 9 which, presumably, is the part of PC 1 in closest proximity to the user. The connection between circuit 24 and source 26 could be a wire extending from circuit 24 which would be inside cabinet 5.

Figure 3:
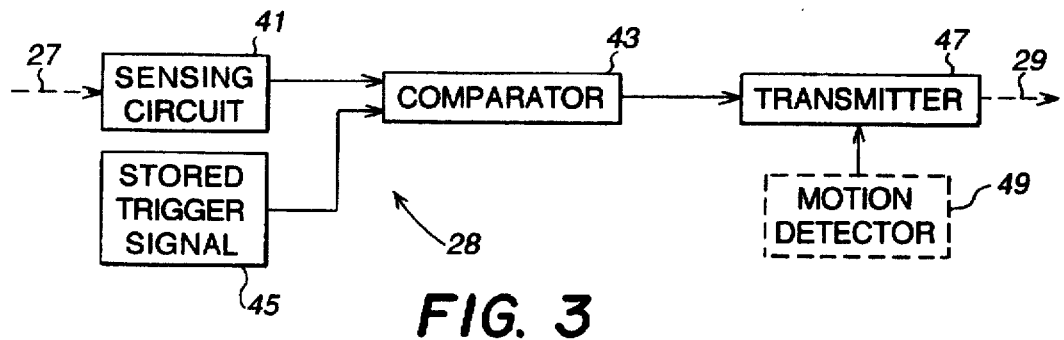
FIG. 3 is a schematic circuit diagram of a portable ID signal source of the present invention.

Source 26 generates a trigger signal 27 which is emitted into the room. As shown in FIG. 3, ID signal source 28 is designed to respond to signal 27 by transmitting its own ID signal 29. Source 28 is a wearable item such as a watch, pendant or clip-on device. The most convenient item would seem to be a watch because that is an item that is worn on a daily basis by everyone. Thus, source 28 would be designed into a watch. It includes a sensing circuit for responding to trigger signal 27. Comparator 43 determines whether a match exists between the output of circuit 41-and the stored code in memory 45 which identifies the trigger signal. If so, then comparator 43 causes transmitter 47 to emit ID signal 29. Source 28 can also be provided with a motion detector 49. This circuit responds to motion of the wearable item to produce a signal which keeps transmitter 47 operative. Of course, this signal could also be provided to comparator 43, for example. If no such signal is received by transmitter 47, outputting of ID signal 29 will be inhibited. This prevents false measurements due to someone placing a monitoring watch (i.e. source 28) on a table near source 26 and then leaving the area.

Thus, when a trigger signal 27 is sensed by source 28, it emits signal 29. The nature of signal 29 could be the same as signal 27, but not necessarily so. Trigger signal 27 could, for example, be an acoustic signal whereas ID signal 29 can be RF, or vice versa. In any case, ID signal 29 is a code uniquely assigned to each of the individuals participating in the computer user monitoring operations. Each participating computer user is given a particular watch into which a unique code has been stored. Thus, as the user accesses one of the available data bases with PC 1, the identity of that user is determined, or determinable, when source 28 is triggered to emit ID signal 29.

ID signal 29 is detected by a sensing device 30 of monitoring system 20. The sensing device can be installed on keyboard 9 or on PC 1. Preferably, it is combined with trigger signal source 26 in a transceiver arrangement. This sensing device 30 must also have certain performance characteristics in order for it to perform its intended function properly. Firstly, the range of sensitivity must be limited so that it responds to ID signal 29 from only the user who is operating PC 1. Thus, if there are several PC's in the room, if the range of sensitivity for this component is too high, then the ID signal 27 from the user on another PC might be undesirably detected. Therefore, the sensitivity range should be approximately 3 feet. Secondly, the device should be relatively small and of the type which lends itself readily for a retrofit of a PC.

The output of sensing device 20 is provided to ID signal processor 31. Included in circuit 31 is a memory for storing all the ID codes that are "acceptable" as belonging to participants of this monitoring operation. It is possible that various devices will be transmitting codes that might be picked up by the sensing device 30. However, it is only those codes that are characteristic of ID signals which are used for the purpose of monitoring the individuals that are using the computer which are of interest to the present invention. This can be done by storing a plurality of such ID code signals which will be recognized by circuit 31. Alternatively, it is not necessarily the entire code of the ID signals that needs to be stored but, rather, only certain leading digits which are characteristic of such "acceptable" ID signals that are to be recognized. Processor 31 also includes a comparator to determine whether an inputted signal matches any of the stored codes. If so, then that code is passed to memory 33.

Memory 33 can be any type of permanent memory which can be written into and retrieved from. A time circuit can also be provided for registering the time at which the ID signal was detected. Time circuit 35 need not be discussed in detail because examples of such are well known. Memory 33 can also be used to store information from data base control circuit 37. This circuit is coupled to code detector 22 and is utilized to provide information which associates the individual, as identified by the unique ID signal, with the specific source of the data base which that user was accessing. Thus, for example, the code for CD ROM 15 could be "115", for on-line service 14 it could be "114", and for disk drive 13 it could be "113". Code detector 22 detects this code and passes it to control circuit 37 where it is temporarily held. Control circuit 37 could then function to transfer this code to memory 32 at the appropriate time together with signals from circuit 31 and timing device 35. An alternative function for circuit 37 is to interpret the code received from code detector 22 and apply its own code which contains different information or additional information. For example, rather than merely passing code "115", for example, to memory 33 at the appropriate time, circuit 37 could be used to put in a shorter code (say one digit) to identify the source of the data base in order to occupy less space in memory 33. Alternatively, circuit 37 can be utilized to refrain from providing further data (i.e. after the first input) to memory 33 unless and until a different data base is accessed by the user; once again to minimize the necessary space in memory 33. A further possibility is to have circuit 37 identify the type of data base that is being accessed. Thus, on-line service 14 may be identified only by code "114", as indicated above, but this would not reveal what in particular is being accessed on the Internet, for example. Thus, the code for a particular newspaper could be "11422", with the "22" identifying, for example, the New York Times. Additional specificity can be gained by providing a code, such as "1142201", with the "01" indicating the classified section of the New York Times which was reached via Internet. This can all be provided by control circuit 37 with the assistance of code detector 22. Control circuit 37 could have settings on it which are controllable or preprogrammed to provide all or only some of this information, only examples of which are provided hereinabove.

Thus, memory 37 is a permanent memory into which is stored data that identifies the computer user, the time at which that user's ID signal was received from ID signal source 28, and information about the data base being accessed by that user and its source. Data would be stored into memory 37 only if an ID code is outputted by processor 31. Thus, the latter triggers the storage function.

The information in memory 33 can be retrieved by a downloading control circuit 39 in any one of several well known ways. For example, memory 33 can be a removable memory device, such as a floppy disk, which can be manually removed at periodic intervals and taken to a main processing center where this information is retrieved and processed by a mainframe computer. Another alternative is to do the downloading by telephone to the mainframe computer, in which case circuit 39 includes the appropriate, well known circuitry for accomplishing that task in terms of timing, modem, and control devices. The mainframe computer includes the stored data on all the participating individuals so that correlations can be obtained between data monitored by system 20 with the ID data stored in the mainframe computer.

Figure 4A:
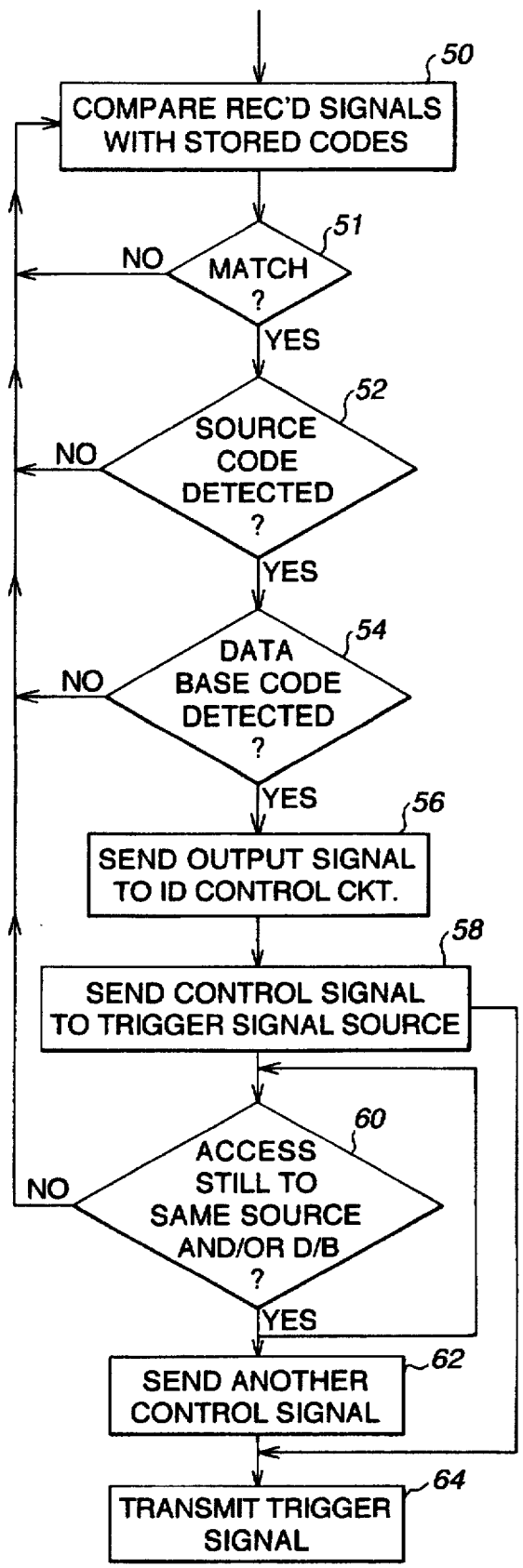
FIGS. 4A to 4C are flow charts of operations performed by the apparatus of FIGS. 1 to 3 in accordance with the present invention.

FIG. 4A is a flow chart showing steps taken to produce control signals by trigger signal source 26. Step 50 compares signals inputted to code detector 22 with codes that are stored therein related to the source and/or data bases. When such a match is found by step 51, step 52 determines whether it is indicative of a source. Step 54 determines whether it is indicative of a data base. Either one of these steps can be deleted depending on the aims of the particular monitoring operation. It is thought, although this is subject to change depending on how the present invention will be put to use, that the more useful result involves monitoring of the data bases and/or portions of the data bases. Thus, step 54 is likely to be the one retained. However, for the purposes of explaining the present invention in its overall contribution, monitoring of the source can also play a role.

In any case, based on the results obtained by steps 52 and/or 54, step 56 sends an output signal to ID control circuit 24. As a result, circuit 24 provides a control signal to trigger signal source 26, per step 58. ID control circuit 24 determines, by way of the input signal from CPU 7, whether PC 1 is still accessing the same source and/or data base as was being accessed when step 56 was performed. This is done by step 60. If so, then another control signal is transmitted by step 62. The transmission of each control signal is accompanied by step 60 looping back to itself so as to, at preset timing intervals, conduct this step 60 once again. Thus, prior to each control signal being transmitted by circuit 24, step 60 conducts a test based on the input from CPU 7. Every control signal from circuit 24 results in a trigger signal being emitted per step 64 by source 26. This serves to monitor the identity of the computer user at preset intervals. If step 60 indicates that the source and/or data base has been changed, then the system loops back to step 50 to await another match being made of a code received by code detector 22.

Figure 4B:
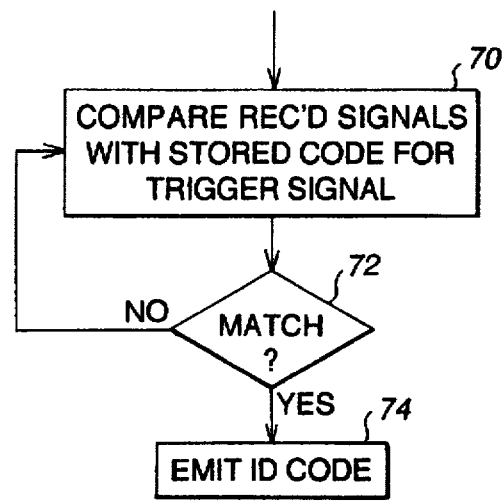

FIG. 4B is a flow chart showing steps taken by ID signal source 28 in response to the receipt of a trigger signal 27. Specifically, step 70 checks a received signal with the stored trigger signal. If a match is detected by step 72, then step 74 emits the coded ID signal 29. Of course, if a motion detector 49 is used, then an additional intervening step would be provided between steps 72 and 74 to insure that the requisite motion exists.

Figure 4C:
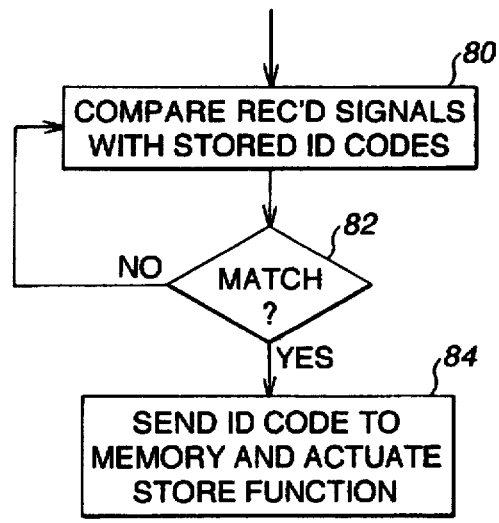

FIG. 4C is a flow chart showing the steps taken by monitoring system 20 in response to the receipt of an ID signal source. When such signals are received by step 80, a comparison is made with the ID codes that are stored in processor 31. If the received signal matches one of such stored codes, as per step 82, then step 84 passes that ID code to memory 33. Moreover, the storage operation is actuated thereby to store signals from circuits 37 and 35, as explained above.

Although a preferred embodiment of the present invention has been described in detail above, various modifications thereto will be readily apparent to one with ordinary skill in the art. For example, although code detector 22 and ID control circuit 24 have been described as separate circuits, these two can be combined into one. Likewise, data base control circuit 37 can be combined with one or both of code detector 22 and ID control circuit 24. Conversely, a circuit such as ID signal detector and processor 31 can be broken out into a number of circuits which together perform the above-described functions. These and other such modifications are intended to fall within the scope of the present invention as defined by the following claims.

I claim:

1. Apparatus for monitoring access by computer users to data bases available on information sources, the apparatus including a stationary monitoring portion and a plurality of portable transmitter devices respectively associated with such users, wherein the stationary monitoring portion comprises:

a signal detector responsive to code signals respectively stored in association with the data bases and information sources and respectively unique thereto, a comparator responsive to said signal detector for producing an output signal when a match exists between a code signal detected by said signal detector and a stored code which corresponds to one of the data bases and information sources that is being monitored, a trigger signal source responsive to the output signal of said comparator for emitting a trigger signal adapted to trigger emission of ID signals by the portable transmitter devices, an ID signal processing circuit responsive to the emitted ID signal to compare the emitted ID signal with stored ID codes and, if a match with a particular ID code is found, to output the particular ID code, and a memory coupled to the output of said ID signal processing circuit to store said particular ID code; and wherein each of said portable transmitter devices comprises transmitter means for emitting the ID signals which are respectively unique to the associated users, and means responsive to said trigger signal to actuate said transmitter means.

2. The apparatus of claim 1, wherein the ID code stored in each of said plurality of portable transmitter devices is unique.

3. The apparatus of claim 1, wherein the signal detector receives a coded signal from the information sources identifying the information source.

4. The apparatus of claim 1, wherein the signal detector receives a coded signal from the information source identifying the data base.

5. The apparatus of claim 1, wherein the signal detector receives a coded signal from the information source identifying the portion of the data base accessed by the computer use.

6. The apparatus of claim 1, further comprising a control circuit between said comparator and said trigger signal source for producing a control signal at preset intervals for input to said trigger signal source as long as an accessed source and/or data base matched by said comparator remains unchanged.

7. Apparatus for monitoring access by computer users to a data base having a code applied thereto, the apparatus including a stationary unit and a plurality of portable devices, wherein the stationary unit comprises:
- a detector for detecting the code when the data base is accessed and producing an output signal in response thereto,
- a trigger signal source for emitting a trigger signal responsive to said output signal, and
- a memory;

wherein the portable devices are adapted to be worn by the computer users, respectively, and are responsive to said trigger signal only within a predetermined distance from said trigger signal source to emit an ID signal unique to the particular computer user wearing it; and wherein said memory stores the ID signal of the particular computer user.

8. A method for monitoring access by computer users to data bases available on information sources with apparatus including a stationary monitoring portion and a plurality of portable transmitter devices respectively associated with such users, comprising the steps of:

detecting a signal corresponding to code signals respectively stored in association with the data bases and information sources and respectively unique thereto, determining whether a match exists between the detected signal and a stored code which corresponds to one of the data bases and information sources that is being monitored, emitting a trigger signal, when said determining step finds a match, which is adapted to trigger emission of ID signals by the portable transmitter devices, triggering the portable transmitter devices in response to said trigger signal to emit the ID signals, responsive to the emitted ID signals, comparing the emitted ID signals with stored ID codes and, if a match with a particular ID code is found, outputting the particular ID code, and storing said particular ID code.

9. A method for monitoring access by computer users to a data base having a code applied thereto, by apparatus including a stationary unit and a portable device, comprising the steps of:

detecting the code when the data base is accessed and producing an output signal in response thereto;

emitting a trigger signal from the stationary unit in response to said output signal;

providing the portable device to be carried by computer users so that it is responsive to said trigger signal within a predetermined distance from the stationary unit to emit an ID signal unique to the computer user wearing it; and comparing the ID signal from said portable device with stored ID codes and, if a match is found, storing a matched ID signal.

* * * * *